United States Patent
Carter et al.

(10) Patent No.: US 10,208,462 B2
(45) Date of Patent: Feb. 19, 2019

(54) SYSTEMS AND METHODS FOR PRECIPITATION COLLECTION

(71) Applicants: Ramsey Carter, Denver, CO (US); James Carter, Denver, CO (US)

(72) Inventors: Ramsey Carter, Denver, CO (US); James Carter, Denver, CO (US)

(*) Notice: Subject to any disclaimer, the term of this patent is extended or adjusted under 35 U.S.C. 154(b) by 440 days.

(21) Appl. No.: 14/073,232

(22) Filed: Nov. 6, 2013

(65) Prior Publication Data

US 2014/0129031 A1  May 8, 2014

Related U.S. Application Data (60) Provisional application No. 61/723,205, filed on Nov. 6, 2012.

(51) Int. Cl.
| | |
|---|---|
| *G05B 21/00* | (2006.01) |
| *G01M 1/38* | (2006.01) |
| *G05B 13/00* | (2006.01) |
| *G05B 15/00* | (2006.01) |
| *G05D 23/00* | (2006.01) |
| *E03B 3/02* | (2006.01) |
| *E04D 13/00* | (2006.01) |
| *E04D 13/04* | (2006.01) |

(52) U.S. Cl.
CPC ............... *E03B 3/02* (2013.01); *E04D 13/00* (2013.01); *E04D 2013/0495* (2013.01); *Y02A 20/108* (2018.01); *Y10T 137/0318* (2015.04); *Y10T 137/5762* (2015.04)

(58) Field of Classification Search
CPC . A01G 25/16; A01G 3/04; A01G 7/00; A01D 46/24; B07C 5/342
See application file for complete search history.

(56) References Cited

U.S. PATENT DOCUMENTS

| 6,436,283 B1* | 8/2002 | Duke ....................... E03B 3/02 210/172.1 |
| 2001/0030161 A1* | 10/2001 | Hosoya ................... C02F 1/722 210/744 |
| 2004/0177557 A1* | 9/2004 | Reissler ............... B65D 88/123 49/260 |
| 2008/0034492 A1* | 2/2008 | Essig, Jr. ................... F24J 2/02 4/507 |

(Continued)

*Primary Examiner* — Mohammad Ali
*Assistant Examiner* — Md Abul Azad
(74) *Attorney, Agent, or Firm* — Polsinelli PC (57) ABSTRACT

Implementations described and claimed herein provide systems and methods for harvesting water from precipitation while limiting loss due to evaporation and sublimation. In one implementation, precipitation is received on a collection surface through an opening during a precipitation event. The received precipitation is sealed on the collection surface from an outside atmosphere using at least one cover assembly in response to a triggering event concluding the receipt of the precipitation. The at least one cover assembly includes a take-up assembly adapted to extend a cover from a first cross bar to a second cross bar over at least a portion of the opening. Water harvested from the sealed precipitation is directed to a water storage device. Other implementations described and claimed herein provide systems and methods for remote monitoring and management of water collection devices.

18 Claims, 10 Drawing Sheets

(56) References Cited

U.S. PATENT DOCUMENTS

2011/0120561 A1\* 5/2011 Quigley .................... E03F 1/00
 137/1
2012/0017996 A1\* 1/2012 Wenger .................... E03B 3/03
 137/1

\* cited by examiner

SYSTEMS AND METHODS FOR PRECIPITATION COLLECTION

CROSS-REFERENCE TO RELATED APPLICATIONS

The present application claims benefit under 35 U.S.C. § 119(e) to U.S. Provisional Patent Application No. 61/723,205, entitled "System and Methods for Precipitation Collection" and filed on Nov. 6, 2012, which is specifically incorporated by reference herein in its entirety.

BACKGROUND

Water collection is increasingly challenging as water tables in many geographical areas are dropping or exhausted. Consequently, reaching water tables via conventional drilled wells is expensive and often fruitless. As a result, many have turned to rainwater or greywater harvesting, which involves the collection and storage of rainwater for a variety of domestic, urban, and commercial uses, including, for example, drinking water and irrigation. Such harvesting allows individuals to obtain an independent water supply for their own domestic uses, particularly during droughts or periods of regional water use restrictions.

The challenges of water collection are often exacerbated by the climate. For example, many climates where the need for alternative water sources is great receive little rainfall throughout the year, such that maintaining an independent water supply is expensive or otherwise impractical. Instead, snowfall is the primary form of precipitation in many of these climates. However, harvesting water from snow is generally challenging and inefficient because a substantial amount of the water is lost directly to the atmosphere via sublimation and/or evaporation, significantly reducing the yield.

It is with these and other issues in mind that various aspects of the presently disclosed technology were developed.

BRIEF SUMMARY

Implementations described and claimed herein address the foregoing problems by providing systems and methods for harvesting water from precipitation while limiting loss due to evaporation and sublimation. In one implementation, precipitation is received on a collection surface through an opening during a precipitation event. The received precipitation is sealed on the collection surface from an outside atmosphere using at least one cover assembly in response to a triggering event concluding the receipt of the precipitation. The at least one cover assembly includes a take-up assembly adapted to extend a cover from a first cross bar to a second cross bar over at least a portion of the opening. Water harvested from the sealed precipitation is directed to a water storage device.

Other implementations described and claimed herein provide systems and methods for remote monitoring and management of water collection devices.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology involve collecting water from precipitation, including, without limitation, snow, rain, ice, sleet, and/or the like, while limiting the loss of water during collection due to evaporation and/or sublimation. In general, a water collection device receives and holds precipitation on at least one collection surface during a precipitation event. Once the precipitation event ends or the amount of precipitation received on the collection surface reaches a threshold value, a cover assembly extends a cover over the collection surface, which together with side and end panels, seals the precipitation from the outside atmosphere. The cover assembly and panels prevent weather or debris from blowing the precipitation away and create a greenhouse to rapidly melt the precipitation into water, which drains into a water storage device. Any collected precipitation that evaporates or sublimates condenses onto the cover assembly and/or panels and is directed into the drains and subsequently into the water storage device. Because the cover assembly and panels trap evaporated and/or sublimated water rather that permitting the water to escape into the outside atmosphere, the volume of harvested water significantly increases.

Some aspects of the presently disclosed technology involve a take-up assembly permitting a user to manually retract and extend the cover before, after, and/or during precipitation events. For example, a user may manually extend and retract the cover using a handle or an electric motor operating according to on-site user input. However, many users are frequently away from the water collection device, such that manually operating the water collection device on-site in response to each precipitation event is difficult and impractical. Accordingly, other aspects of the presently disclosed technology involve remote monitoring and management of one or more water collection devices. In general, the water collection device includes one or more sensors to detect weather conditions, operational parameters of the water collection device, and any other factors that may impact water collection. In one particular aspect, a user, such as a client or an administrator of a water collection service, remotely monitors and manages one or more water collection devices by receiving and analyzing data from the one or more sensors using a network. In another particular aspect, the water collection device receives and analyzes the data received from the one or more sensors and automatically responds by extending or retracting the cover.

For a detailed description of an example water collection device 100, reference is made to FIGS. 1-4, which show the water collection device 100 used in conjunction with a structure having a roof 102, such as a house, shed, building, or the like. However, it will be appreciated by those of ordinary skill that the water collection device 100 may be a stand alone device or integrated into another apparatus or system, including, without limitation, a solar energy collection device or other alternative energy collection device.

As can be understood from FIGS. 1-4, the water collection device 100 includes at least one collection surface 104. It will be appreciated by those of ordinary skill that the collection surface 104 may: include one or more sloped surfaces; be generally flat with one or more low points, include one or more contoured surfaces; include one or more angled surfaces; and/or shaped to mirror, match, or otherwise integrate with any roofing design. As such, the water collection device 100 may be adapted to be added onto an existing roofing system.

Figure 1:
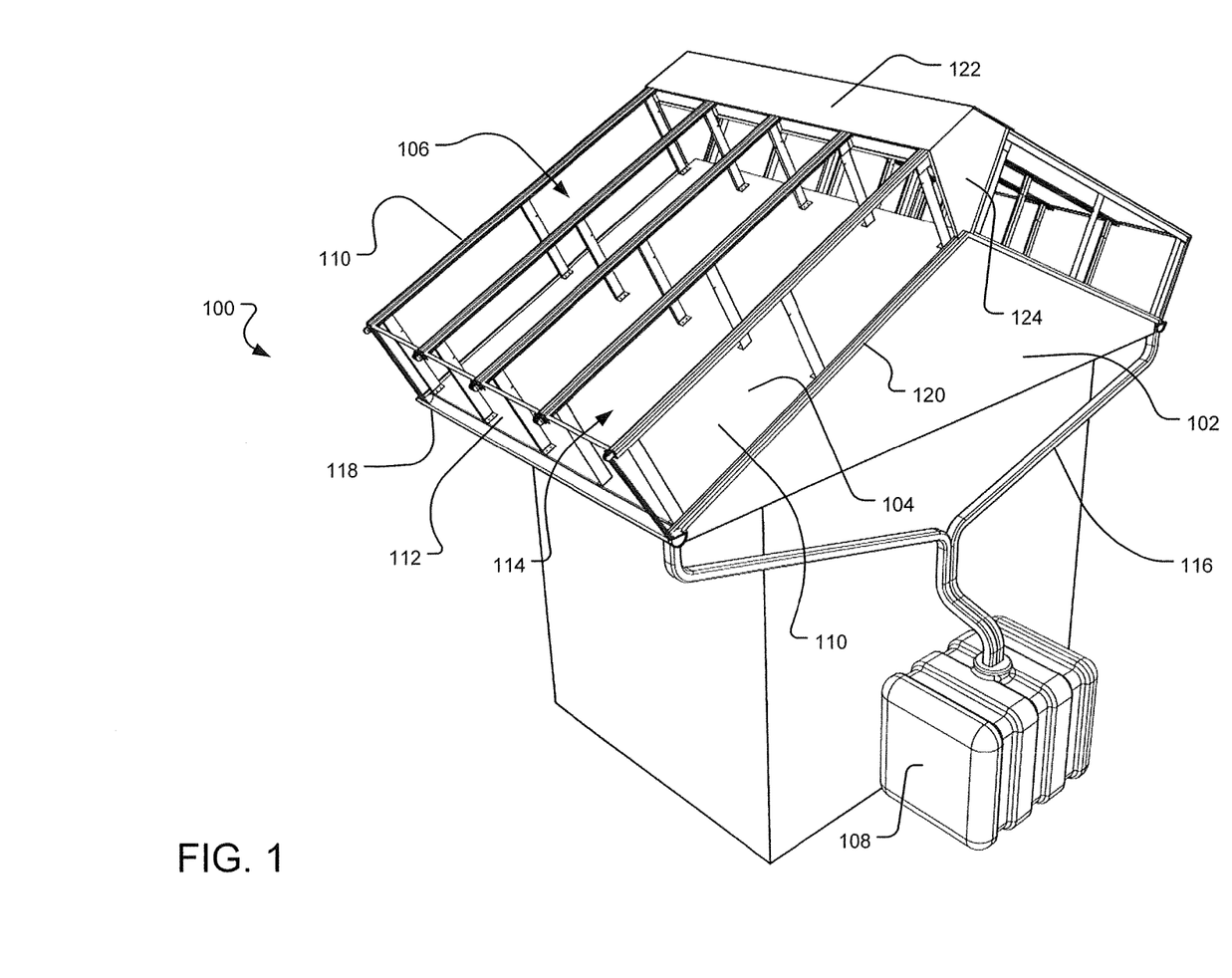
FIG. 1 illustrates an isometric view of an example water collection device.
Figure 2:
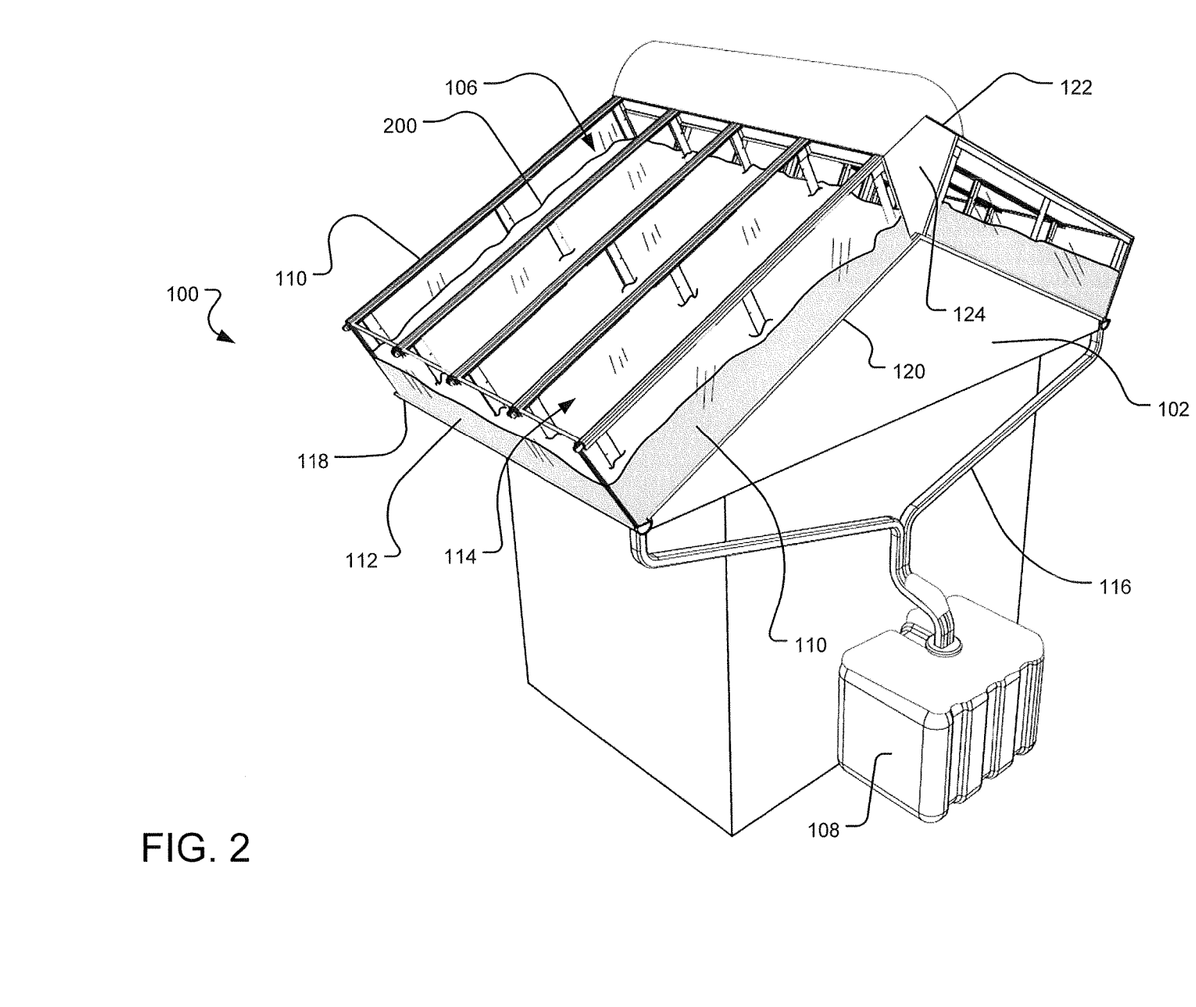
FIG. 2 shows the water collection device of FIG. 1 after a precipitation event.
Figure 3:
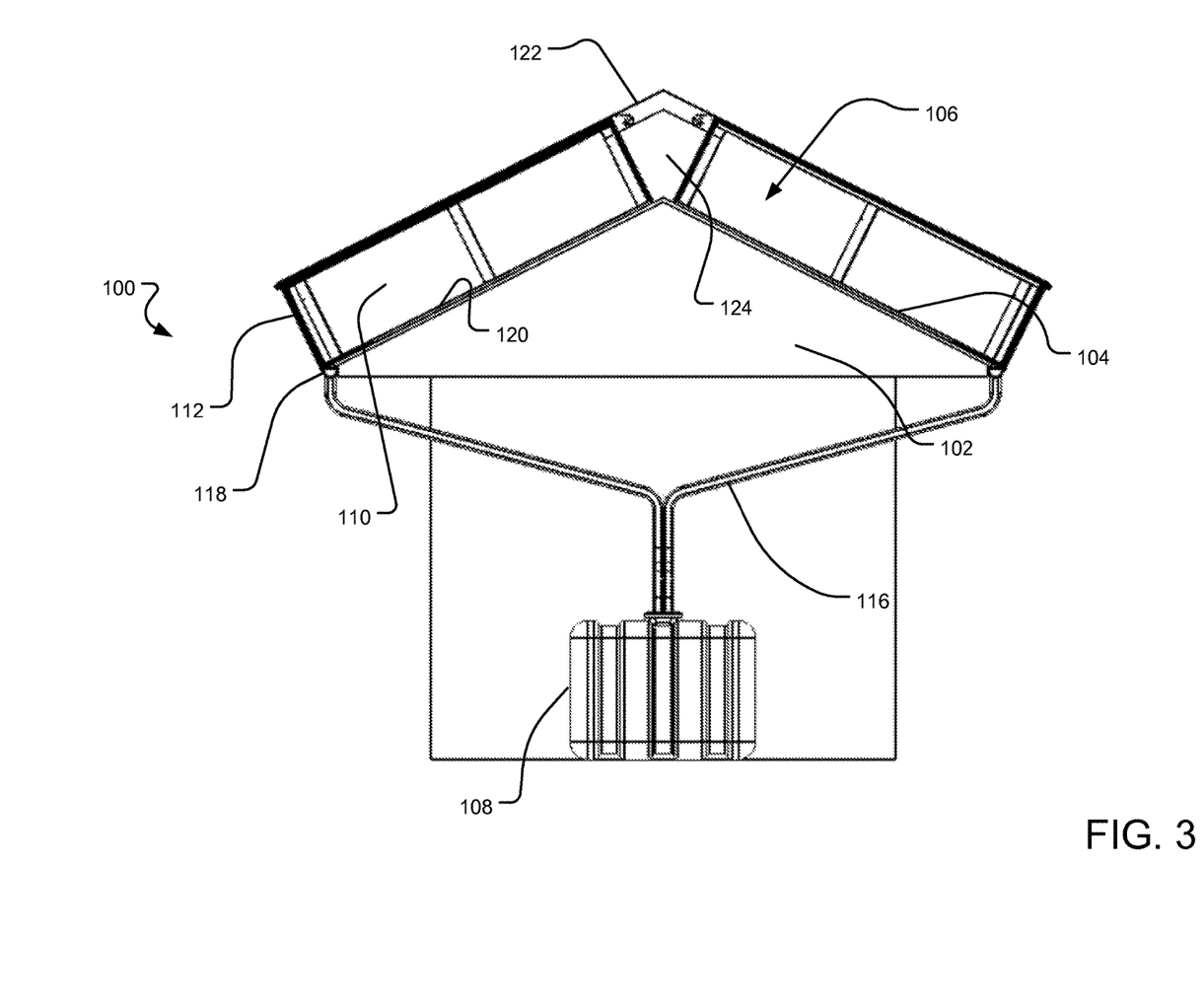
FIG. 3 illustrates a side view of the water collection device of FIG. 1.

Turning to FIGS. 1-2, which illustrate the water collection device 100 before and after a precipitation event, respectively, it will be understood that the collection surfaces 104 are adapted to receive and collect precipitation, such as snow 200, received via an opening 106. Water that is harvested from the snow 200 collected on the collection surface 104 is guided to and stored in a water storage device 108, which may be any device adapted to store water, such as a cistern. The water storage device 108 may direct harvested water to additional storage devices as others become full or otherwise unavailable to store water. Further, the water storage device 108 may direct the harvested water to devices for treatment or use.

In one implementation, with respect to each collection surface 104, the water collection device 100 includes one or more side panels 110 and an end panel 112. The water collection device 100 may include more or fewer panels depending on the shape and size of the collection surface 104. In one implementation, the panels 110 and 112 are relatively robust to hold and protect precipitation received onto the collection surface 104. The panels 110 and 112 may be made from a variety of materials, including, but not limited to: a material having a relatively low haze and high transparency; a material being relatively opaque; a material adapted to maximize solar gain to rapidly melt any precipitation; or any combination thereof. The panels 110 and 112 may consistent of at least a portion of the structure (e.g., a wall, floor, roof, ceiling, etc.) in which the water collection device 100 is integrated. Further, the panels 110 and 112 may be designed to match or compliment any of the collection surface 104, the roof 102, and/or the structure including the water collection device 100. As such, the panels 110 and 112 may be clear, colored, and/or display a design, pattern, or graphics. Additionally, the panels 110 and 112 may be a variety of shapes, including, but not limited to, rectangular, triangular, trapezoidal, contoured, rounded, angular, and/or any other shape based on the shape and size of any of the collection surface 104, the roof 102, or the structure including the water collection device 100.

Figure 4:
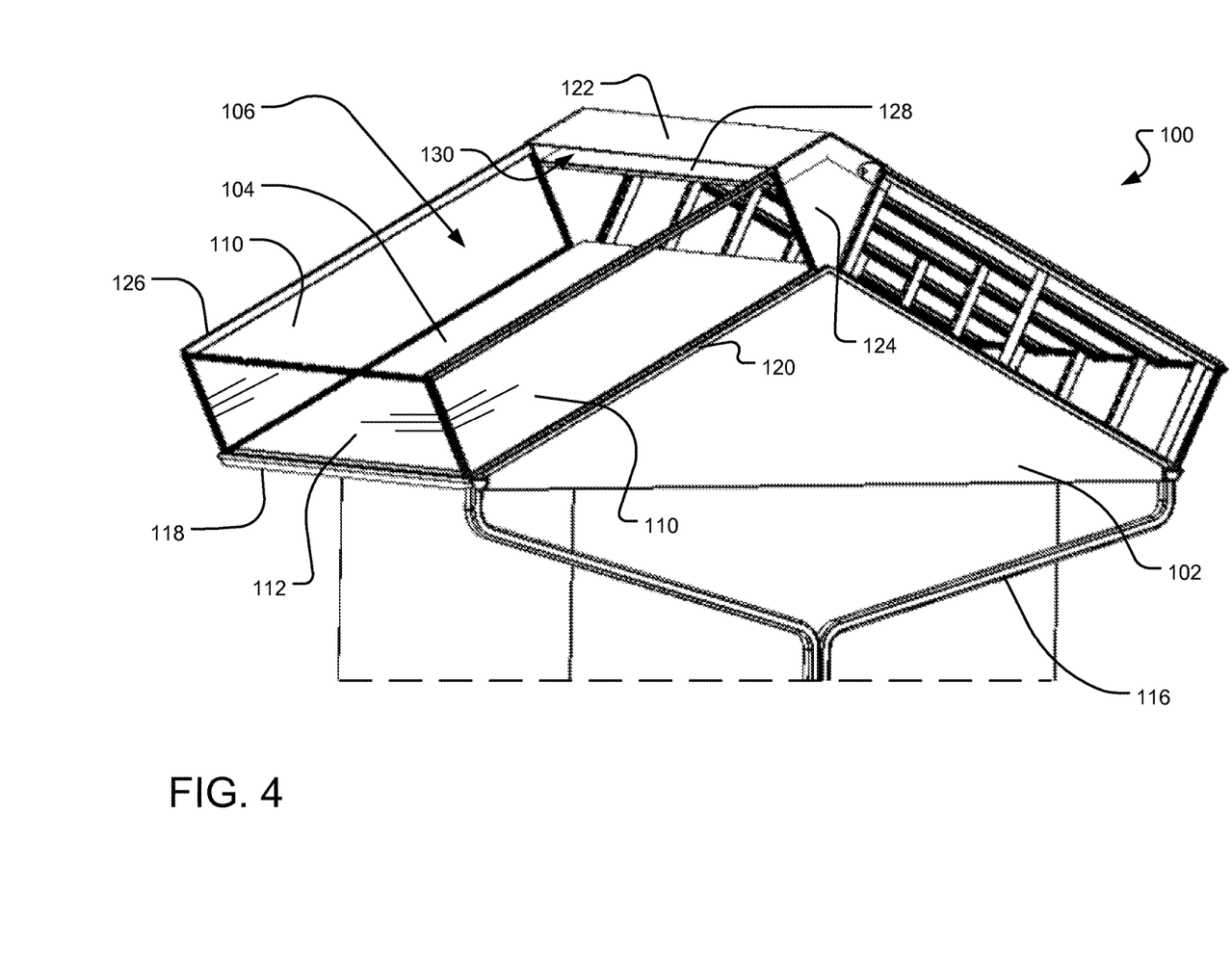
FIG. 4 shows a perspective view of the water collection device of FIG. 1 with cover assemblies not shown for clarity.

As can be understood from FIG. 4, in one implementation, the panels 110 and 112 are placed along a periphery of the collection surface 104, such that each panel 110 and 112 directly or indirectly engages the collection surface 104 and at least one other of the panels 110 and 112. The panels 110 and 112 enclose the collection surface 104, leaving the opening 106 over the collection surface 104 through which precipitation may be received. In one implementation, the water collection device 100 includes at least one cover assembly 114 for covering and uncovering the opening 106, for example, based on weather conditions. When the cover assembly 114 is retracted such that the collection surface 104 is uncovered during a precipitation event, the collection surface 104 receives precipitation through the opening 106.

Upon receipt, liquid water from the precipitation is guided to the water storage device 108 via a drain 116. In one implementation, the water collection device 100 includes a gutter 118 and a channel 120 to direct liquid water to the drain 116. Frozen or partially frozen precipitation, such as the snow 200, ice, hail, sleet, or the like, collects on the collection surface 104, for example, as shown in FIG. 2. Precipitation is collected on the collection surface 104 until a triggering event occurs, which concludes the receipt of the precipitation. A triggering event may correspond, for example, to: the ending of the precipitation event; a user's desire to cease collection of additional precipitation; and/or the amount of precipitation collected reaching a threshold value, which represents a capacity one or more components of the water collection device 100. For example, the collection surface 104 cannot hold additional precipitation (e.g., due to weight and/or volume of the precipitation), the water storage device 108 is full, and/or the like. The triggering event may be determined, for example, by manual inspection, remote inspection, using one or more sensors (e.g., as described with respect to FIGS. 9 and 10), or using information sources. When a triggering event is determined or otherwise identified, the cover assembly 114 covers the collection surface 104, which together with the panels 110 and 112 substantially seals the precipitation from the outside atmosphere. Sealing the precipitation in this manner eliminates or substantially reduces the amount of water lost to the outside atmosphere via evaporation and/or sublimation.

Some implementations include a ridge cap 122 and ridge panels 124 to seal the collection surface 104 at areas where a sloped, contoured, angled, or shaped surface peaks or otherwise protrudes. For example, as shown in the example illustrated in FIGS. 1-4, the ridge cap 122 may be placed at the peak of the roof 102 to connect and seal two collection surfaces 104. The ridge cap 122 may further connect to one or more rails 126 to provided added structural support for the panels 110 and 112 and/or the cover assembly 114. Additionally, an enclosure panel 128 may connect to the ridge cap 122 to create an enclosure channel 130 through which components of the cover assembly 114 may be guided for added support, protection, and coverage.

The cover assembly 114, the panels 110 and 112, and the ridge cap 122 prevent weather or debris from blowing the precipitation away and create a greenhouse to rapidly melt the frozen or partially frozen precipitation into water, which eliminates or significantly reduces the occurrence of evaporation or sublimation. Further, any water that evaporates or sublimates condenses onto the cover assembly 114, the panels 110 and 112, or other surfaces enclosed in the water collection device 100, and is directed into the drain 116 and subsequently the water storage device 106. Because the water collection device 100 traps evaporated and/or sublimated water rather than permitting such water to escape into the outside atmosphere, the volume of harvested water significantly increases.

Figure 5:
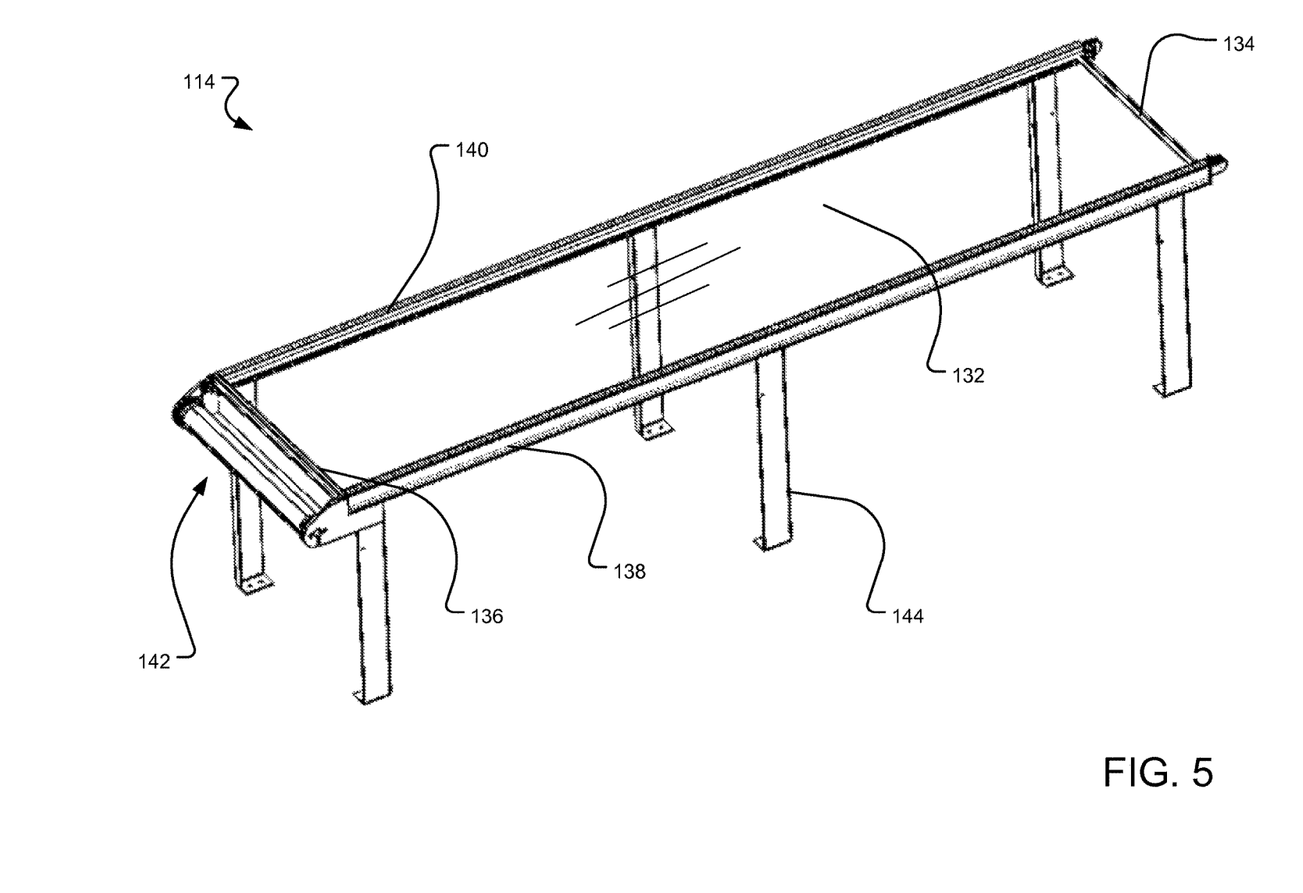
FIG. 5 illustrates a perspective view of an example cover assembly.
Figure 6:
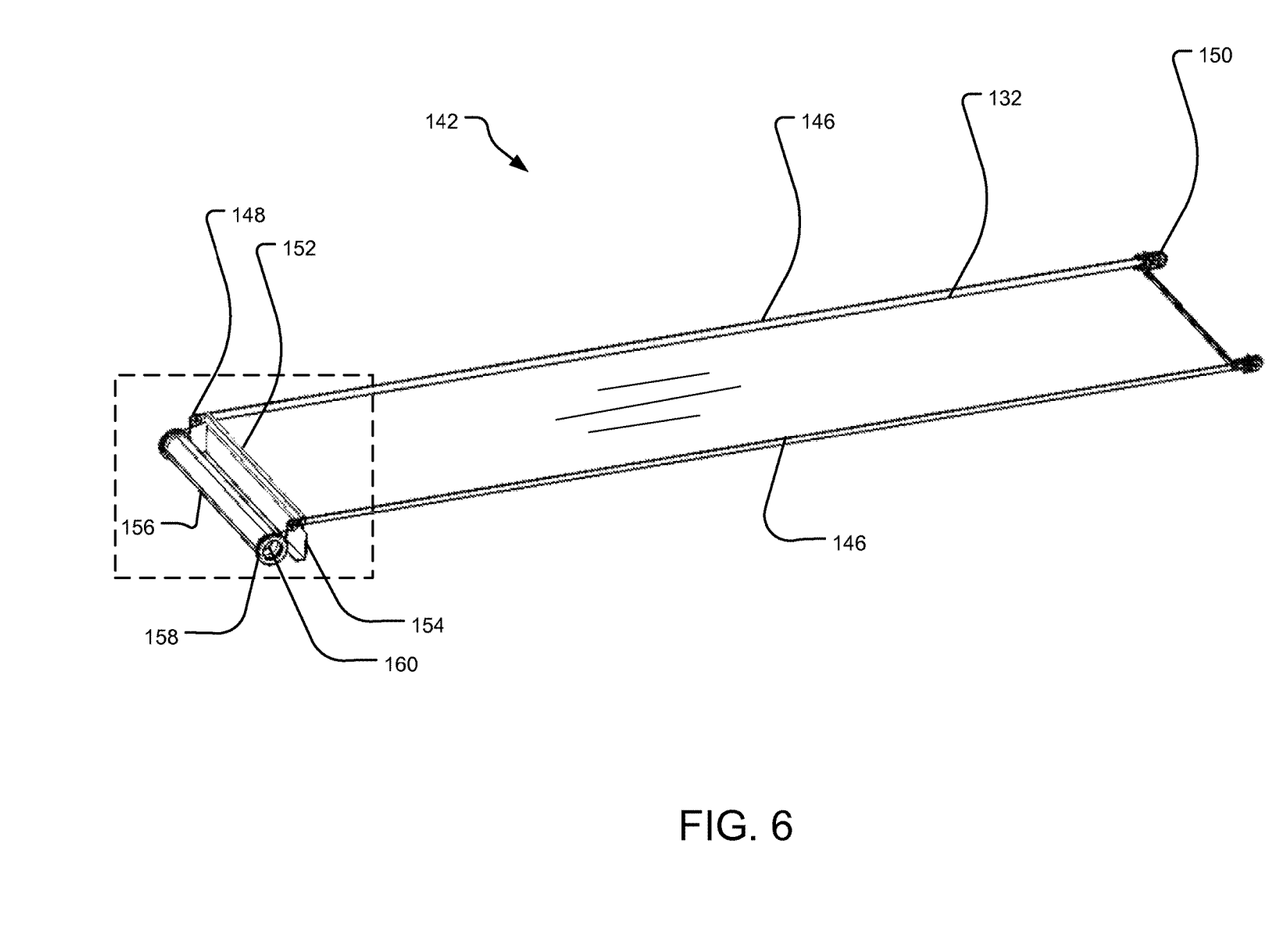
FIG. 6 is the same view as FIG. 6 with a take-up assembly and a cover shown.
Figure 7:
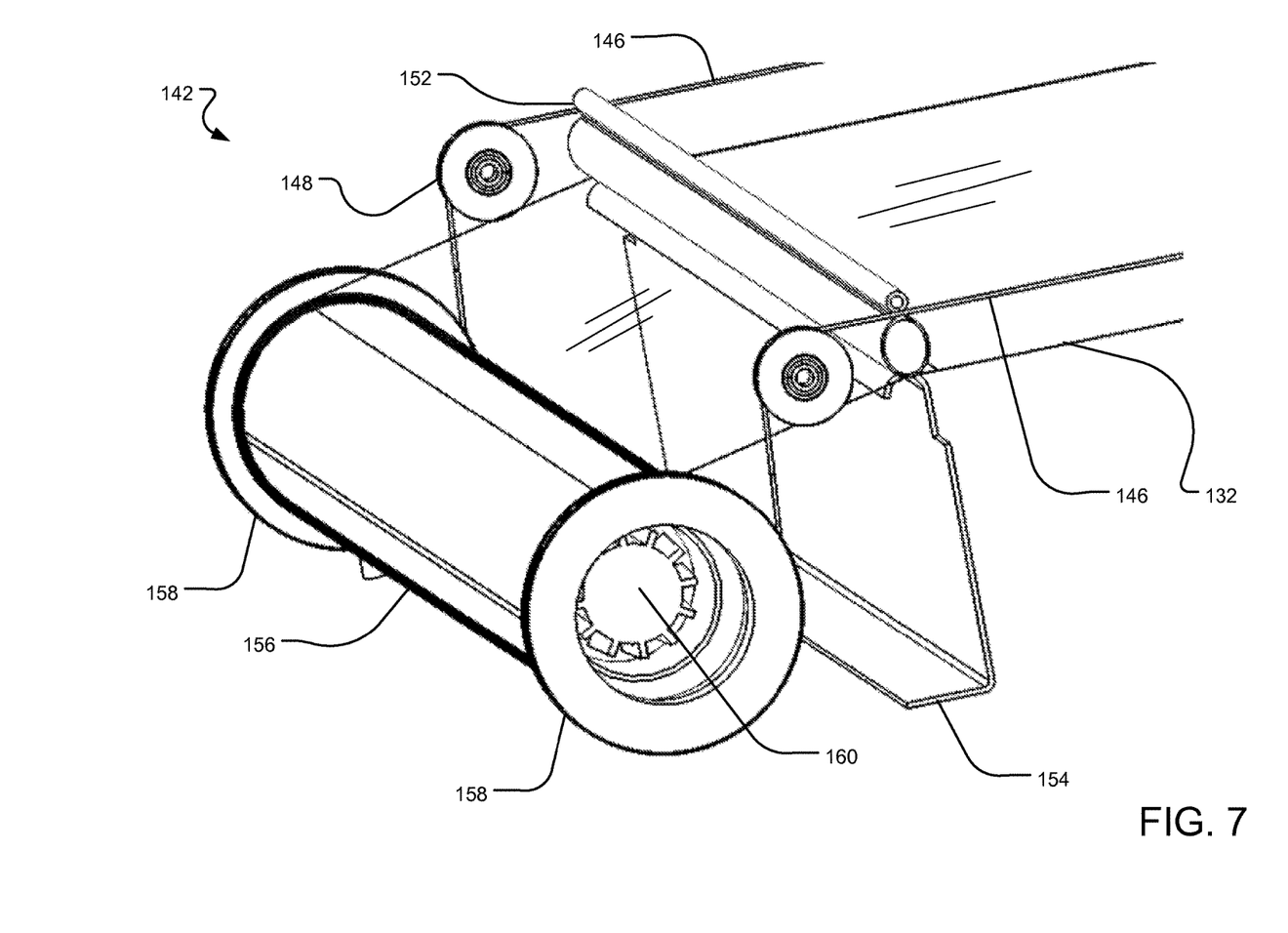
FIG. 7 shows a detailed view of the portion of FIG. 7 surrounded by dotted lines.

Turning now to FIGS. 5-7, a detailed description of an example of the cover assembly 114 is provided. In one implementation, the cover assembly 114 includes a cover 132 that is configured to extend and retract between a first cover cross bar 134 and a second cover cross bar 136 along a first rail 138 and a second rail 140 using a take-up assembly 142. The cross bars 134 and 136 and the rails 138 and 140 provide structural support for the cover 132, which helps guide the cover 132 as it moves and ensures a seal is created when the cover 132 is extended to the first cross bar 134 over the collection surface 104 to cover the opening 106. Some implementations include one or more support members 144 to position and support the cover 114.

The cover 114 may be made from various materials, including without limitation: a material having a relatively low haze and high transparency; a material being relatively opaque; a material adapted to maximize solar gain to rapidly melt any precipitation; and/or any combination thereof. Further, the cover 114 may be clear, colored, or display a design to match the collection surface 104 or other features of the water collection device 100 and/or the structure with which the water collection device 100 is used in conjunction. In one implementation, the cover 114 is a membrane that is flexible enough to compactly store when retracted and robust enough to create a seal without ripples, sags, gaps, etc. For example, the cover 114 may be a membrane made from polyester, polyethylene, polypropylene, polyurethane, or the like with a thickness ranging from approximately 0.15-0.5 mm. In another implementation, the cover 114 may include one or more robust panels. Other covering mechanisms that create a seal when extended and may be compactly stored when retracted are contemplated.

In one implementation, the take-up assembly 142 includes at least one cable 146 that moves the cover 132 using a first set of pulleys 148 and a second set of pulleys 150 through an opening between a gasket 152 and a cover support member 154, which guide and support the cover 132. A cable spool 158 advances or retracts the cable 146. In some implementations, the cable spool 158 is rotated by a user with a handle (not shown). In other implementations, the cable spool 158 is rotated by a motor 160 automatically based on sensor data or manually based on remote or on-site user input. In the example implementation illustrated in FIGS. 6 and 7, a cover spool 156 is shown for collecting the cover 132 when retracted. However, it will be appreciated by those of ordinary skill that other extending and retracting mechanisms are contemplated where other covering mechanisms, for example, one or more robust panels, are utilized.

Figure 8:
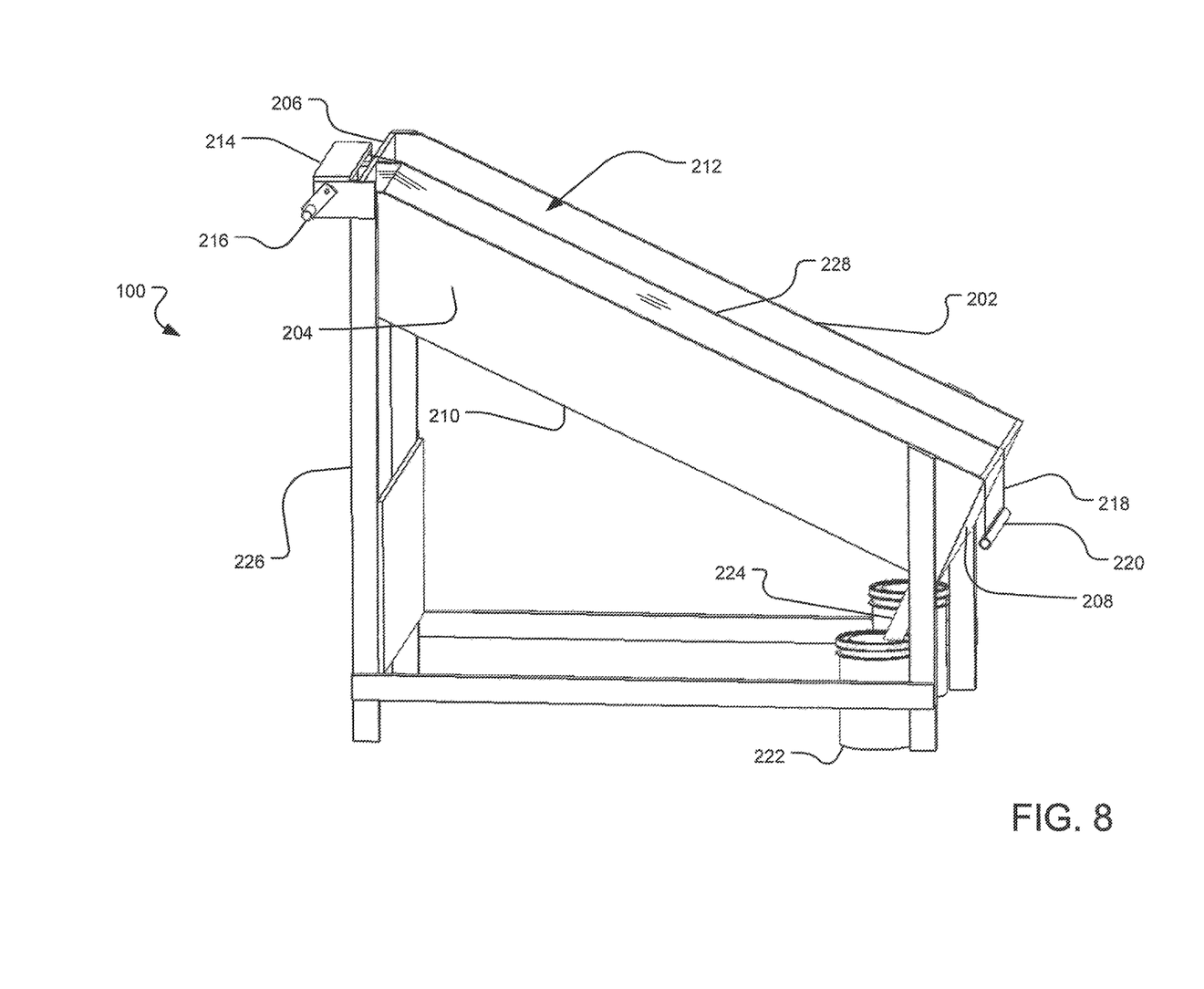
FIG. 8 shows another example water collection device.

As can be understood from FIG. 8, the water collection device 100 may be a stand alone device. In one implementation, the water collection device 100 includes a first side panel 202, a second side panel 204, a first cross bar 206, and a second cross bar 208. The panels 202, 204, 206, and 208 enclose a collection surface 210, leaving an opening 212 through which precipitation may be received.

In one implementation, a take-up assembly 214 includes a handle 216 for extending and retracting a cover 218 from the first cross bar 206 to the second cross bar 208 along the side panels 202 and 204, thereby creating a seal to trap evaporated or sublimated water and to create a greenhouse to rapidly melt frozen or partially frozen water. The cover 218 may include a weight 220 to prevent ripples or sags in the cover 218, ensuring a tight seal. Liquid water is guided to one or more water storage devices 222 via one or more drains 224. The water storage devices 222 may direct harvested water to additional storage devices as others become full or otherwise unavailable to store water. Further, the water storage devices 222 may direct the harvested water to devices for treatment or use. In one implementation, one or more support members 226 position the collection surface 210 to maximize collection of precipitation, orient the collection surface to receive sunlight, and provide a sloping surface for drainage of collected water to the water storage devices 222 via the drains 224.

In one implementation, the water collection device 100 includes a dividing panel 228, which allows part of the collection surface 210 to remain uncovered while another part of the collection surface 210 is covered by the cover 218. This allows part of the collection surface 210 to receive precipitation via the opening 212 while another part of the collection surface 210 is sealed from receiving precipitation collection.

As described herein, in one implementation, the water collection device 100 may be operated manually on-site, using for example, a handle or similar mechanism. In another implementation, the water collection device 100 may be operated manually on-site based on user input. For example, a user may push a button which powers the motor 160 to turn the cable spool 158. However, many users are frequently away from the water collection device 100, such that manually operating the water collection device 100 on-site in response to each precipitation event is difficult and impractical.

Figure 9:
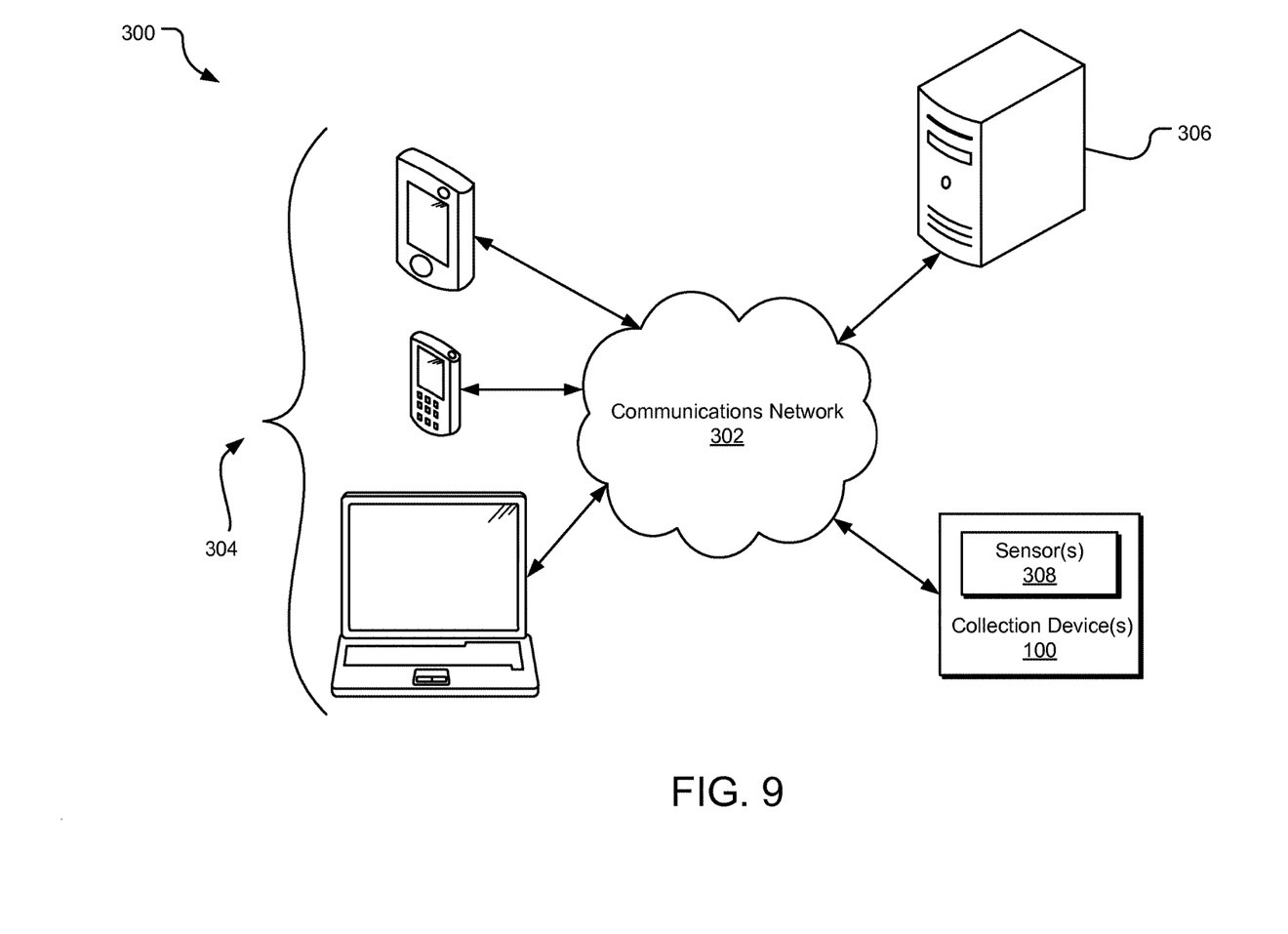
FIG. 9 illustrates an example network environment for remotely monitoring and managing collection devices.

Accordingly, FIG. 9 illustrates an example network environment 300 for remotely monitoring and managing the water collection devices 100. As depicted in FIG. 9, a communications network 302 (e.g., the Internet) is used by one or more computing or data storage devices for implementing a system 300 for remotely monitoring and managing the water collection devices 100. In one implementation, the water collection devices 100 and one or more user devices 304 are communicatively connected to the communications network 302. Examples of the user devices 304 include a terminal, workstation, personal computer, a laptop, a smart-phone, a tablet or slate (e.g., iPad), a multimedia console, a gaming console, a Personal Digital Assistant (PDA), a set top box, and the like. A user may access the system 300 using the user devices 304. Users may include, without limitation: an owner or user of one or more of the water collection devices 100, at the same or different locations; an administrator of a water collection service that monitors and manages one or more water collection devices 100 for one or more clients; and clients of such water collection services.

A server 306 hosts the system 300. In one implementation, the server 306 also hosts a website or an application that users visit to access the system 300. The server 306 may be one single server, a plurality of servers with each such server being a physical server or a virtual machine, or a collection of both physical servers and virtual machines. In another implementation, a cloud hosts one or more components of the system 300. The water collection devices 100, the user devices 304, the server 306, and other resources connected to the communications network 302 may access one or more other servers for access to one or more websites, applications, web services interfaces, etc. that are used to remotely monitor and manage the water collection devices 100. In one implementation, the server 306 also hosts a search engine that the system 300 uses for accessing and modifying information used to remotely monitor and manage the water collection devices 100.

In one implementation, the water collection device 100 includes one or more sensors 308, which receive water collection data relating to weather conditions, operational parameters, and any other factors that may impact water collection. For example, the sensors 308 may include, without limitation, a solar sensor, a wind speed and direction sensor, a humidity sensor, a barometric pressure sensor, a temperature sensor, and/or other sensors for measuring and determining weather conditions. The sensors 308 may further include, without limitation, a load sensor for measuring the output of the motor 160 of the cover assembly, a sensor for measuring the weight of precipitation on the collection surface, a sensor for measuring the level of liquid water stored in the water storage device, a sensor for measuring the vapor content in the sealed air covered by the cover assembly, a thermal sensor, an RBG sensor, and/or other operational sensors. The operational sensors receive data relating to the operation of the water collection device 100, which may indicate, for example, when to extend or retract the cover, whether maintenance is needed, whether debris or an animal is caught in the water collection device 100, and a status of water harvesting. The sensors 308 may further retrieve and/or analyze data provided from various sources, including for example, a weather forecasting service or administration (e.g., National Oceanic and Atmospheric Administration) via the communications network 302.

In one implementation, the sensors 308 receive and analyze the data, and based on the data, automatically issue a command for the motor 160 to extend or retract the cover. In another implementation, raw data from the sensors 308 and/or an analysis of the data is received via the communications network 302 on the user devices 304. In one implementation, a collection analyzer running on the user device 304 or other network component analyzes the data received from the sensors 308 to identify a precipitation event or triggering event and in response extend or retract the cover. Alternatively or additionally, the user may view the data or send a command from the user devices 304 via the communications network 302, for example, to: extend or retract the cover; change the operational parameters of the water collection device 100; determine whether and what type of maintenance is needed for the water collection device 100; determine a status of water harvesting; and/or perform other analyses or functions.

Figure 10:
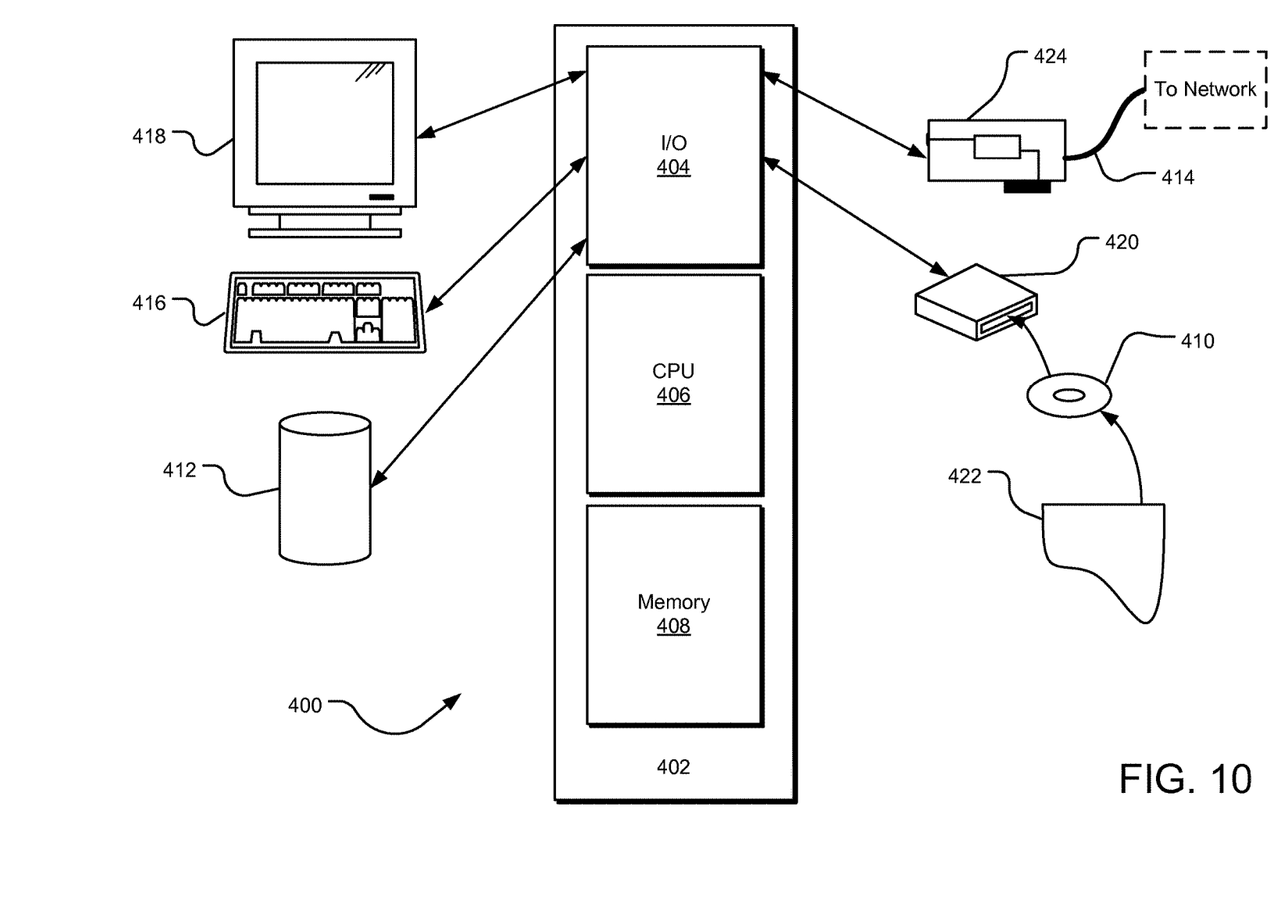
FIG. 10 illustrates an example computing system that may be useful in implementing the presently disclosed technology.

FIG. 10 illustrates an example computing system 400 that may be useful in implementing the presently disclosed technology. A general purpose computer system 400 is capable of executing a computer program product to execute a computer process. Data and program files may be input to the computer system 400, which reads the files and executes the programs therein. Some of the elements of a general purpose computer system 400 are shown in FIG. 10 wherein a processor 402 is shown having an input/output (I/O) section 404, a Central Processing Unit (CPU) 406, and a memory section 408. There may be one or more processors 402, such that the processor 402 of the computer system 400 comprises a single central-processing unit 406, or a plurality of processing units, commonly referred to as a parallel processing environment. The computer system 400 may be a conventional computer, a distributed computer, or any other type of computer, such as one or more external computers made available via a cloud computing architecture. The presently described technology is optionally implemented in software devices loaded in memory 408, stored on a configured DVD/CD-ROM 410 or storage unit 412, and/or communicated via a wired or wireless network link 414, thereby transforming the computer system 400 in FIG. 10 to a special purpose machine for implementing the described operations.

The I/O section 404 is connected to one or more user-interface devices (e.g., a keyboard 416 and a display unit 418), a disc storage unit 412, and a disc drive unit 420. Generally, the disc drive unit 420 is a DVD/CD-ROM drive unit capable of reading the DVD/CD-ROM medium 410, which typically contains programs and data 422. Computer program products containing mechanisms to effectuate the systems and methods in accordance with the presently described technology may reside in the memory section 404, on a disc storage unit 412, on the DVD/CD-ROM medium 410 of the computer system 400, or on external storage devices made available via a cloud computing architecture with such computer program products, including one or more database management products, web server products, application server products, and/or other additional software components. Alternatively, a disc drive unit 420 may be replaced or supplemented by a floppy drive unit, a tape drive unit, or other storage medium drive unit. The network adapter 424 is capable of connecting the computer system 400 to a network via the network link 414, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 400 is connected (by wired connection or wirelessly) to a local network through the network interface or adapter 424, which is one type of communications device. When used in a WAN-networking environment, the computer system 400 typically includes a modem, a network adapter, or any other type of communications device for establishing communications over the wide area network. In a networked environment, program modules depicted relative to the computer system 400 or portions thereof, may be stored in a remote memory storage device. It is appreciated that the network connections shown are examples of communications devices for and other means of establishing a communications link between the computers may be used.

In an example implementation, the computer system 400 is connected to the water collection devices 100 via the communications network 502, as described herein. Sensor data from the sensors 308, a plurality of internal and external databases, source databases, and/or data cache on cloud servers are stored as the memory 408 or other storage systems, such as the disk storage unit 412 or the DVD/CD-ROM medium 410, and/or other external storage devices made available and accessible via a cloud computing architecture. Remote monitoring and management software and other modules and services may be embodied by instructions stored on such storage systems and executed by the processor 402. Some or all of the operations described herein may be performed by the processor 402. Further, local computing systems, remote data sources and/or services, and other associated logic represent firmware, hardware, and/or software configured to control the water collection devices 100. Such services may be implemented using a general purpose computer and specialized software (such as a server executing service software), a special purpose computing system and specialized software (such as a mobile device or network appliance executing service software), or other computing configurations. In addition, one or more functionalities of the system 300 and the water collection devices 100 disclosed herein may be generated by the processor 402, and a user may interact with a Graphical User Interface (GUI) using one or more user-interface devices (e.g., the keyboard 416, the display unit 418, and the user devices 304) with some of the data in use directly coming from online sources and data stores.

The implementations described herein may be implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the presently disclosed technology. Accordingly, the logical operations making up the implementations of the presently disclosed technology described herein are referred to variously as operations, steps, objects, or modules. Furthermore, it should be understood that logical operations may be performed in any order, unless explicitly claimed otherwise or a specific order is inherently necessitated by the claim language. Furthermore, one of more portions of the various processes disclosed above may be implemented by software, hardware, firmware or combination thereof.

The above specification, examples, and data provide a complete description of the structure and use of example implementations of the invention. Various modifications and additions can be made to the exemplary implementations discussed without departing from the spirit and scope of the presently disclosed technology. For example, while the implementations described above refer to particular features, the scope of this disclosure also includes implementations having different combinations of features and implementations that do not include all of the described features. Accordingly, the scope of the presently disclosed technology is intended to embrace all such alternatives, modifications, and variations together with all equivalents thereof.

What is claimed is:

1. A method for harvesting water from precipitation, the method comprising:
   receiving the precipitation on a collection surface through an opening during a precipitation event;
   sealing the precipitation received on the collection surface from an outside atmosphere using at least one cover assembly in response to a command received over a network corresponding to an identification of a triggering event based on water collection data,
   the triggering event concluding the receipt of the precipitation,
   the at least one cover assembly including a take-up assembly adapted to extend a cover from a first cross bar to a second cross bar over at least a portion of the opening,
   the cover made from one or more of a low haze and high transparency material and a material adapted to maximize solar gain; and
   directing water harvested from the sealed precipitation to a water storage device.

2. The method of claim 1, wherein the precipitation is snow.

3. The method of claim 1, wherein the triggering event corresponds to an end of the precipitation event.

4. The method of claim 1, wherein the triggering event corresponds to an amount of precipitation reaching a threshold value.

5. The method of claim 4, wherein the threshold value is a maximum weight of the precipitation on the collection surface.

6. The method of claim 4, wherein the threshold value is a maximum volume of harvested water stored in the water storage device.

7. The method of claim 1, wherein the cover is extended manually using the take-up assembly.

8. The method of claim 1, wherein the cover is extended automatically using the take-up assembly.

9. A system for harvesting water from precipitation, the system comprising:
   a collection surface adapted to receive precipitation through an opening during a precipitation event, the opening formed by a plurality of panels located along a periphery of the collection surface;
   at least one cover assembly having a take-up assembly adapted to extend a cover over at least a portion of the opening in response to a command received over a network corresponding to an identification of a triggering event based on water collection data,
   the cover assembly and the panels sealing the received precipitation from an outside atmosphere when the cover is extended,
   the cover made from one or more of a low haze and high transparency material and a material adapted to maximize solar gain; and
   at least one drain adapted to direct water harvested from the sealed precipitation to a water storage device.

10. The system of claim 9, wherein the cover comprises a flexible membrane.

11. The system of claim 10, wherein the flexible membrane is a polyester membrane.

12. The system of claim 9, wherein the cover comprises one or more robust panels.

13. The system of claim 9, wherein the collection surface is placed on a roof of a structure.

14. The system of claim 9, wherein the take-up assembly comprises at least one cable adapted to move the cover using at least one set of pulleys through an opening between a gasket and a cover support member.

15. The system of claim 14, wherein the cable is moved using a handle.

16. The system of claim 14, wherein the cable is moved using a motor.

17. The system of claim 16, wherein the motor is operated automatically based on the identification of the triggering event, the water collection data being sensed by one or more sensors.

18. A system for remotely monitoring and managing water harvesting from precipitation, the system comprising:
   one or more water collection devices, each of the water collection devices having a collection surface accessible via an opening, a cover being movable along the opening using a take-up assembly,
   the cover made from one or more of a low haze and high transparency material and a material adapted to maximize solar gain;
   one or more sensors configured to capture water collection data; and
   a computer system in communication with the one or more water collection devices over a network, the computer system having at least one processor executing a collection analyzer configured to identify a precipitation event based on the water collection data received from the one or more sensors, the collection analyzer issuing a command over the network to the one or more water collection devices to retract the cover using the take-up assembly to uncover the opening through which precipitation may be received onto the collection surface during the precipitation event, and configured to identify a triggering event based on the water collection data and to issue a command to the one or more water collection devices to extend the cover over the opening using the take-up assembly in response to identifying the triggering event.

\* \* \* \* \*